(12) United States Patent
Maeda

(10) Patent No.: US 7,454,311 B2
(45) Date of Patent: Nov. 18, 2008

(54) COMPUTER-READABLE STORAGE MEDIUM STORING DATA ANALYSIS PROGRAM

(75) Inventor: Kazuho Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 11/288,148

(22) Filed: Nov. 29, 2005

(65) Prior Publication Data

US 2007/0047455 A1    Mar. 1, 2007

(30) Foreign Application Priority Data

Sep. 1, 2005    (JP)    ............................. 2005-254051

(51) Int. Cl.
*G06F 15/00* (2006.01)
(52) U.S. Cl. ...................................... 702/179
(58) Field of Classification Search ................... 702/57, 702/74, 80, 123, 126, 146, 149, 158, 176, 702/179; 704/232; 707/6; 708/400
See application file for complete search history.

(56) References Cited

U.S. PATENT DOCUMENTS 5,528,728 A * 6/1996 Matsuura et al. ............ 704/232
5,930,789 A * 7/1999 Agrawal et al. ................ 707/6
5,940,825 A * 8/1999 Castelli et al. ................. 707/6
2007/0168409 A1* 7/2007 Cheung ....................... 708/400

FOREIGN PATENT DOCUMENTS

JP    5-313899    11/1993
JP    2004-348594    12/2004

OTHER PUBLICATIONS

Kazuki Nakamoto et al., "Fast Clustering for Time-series Data with Average-time-sequence-vector Generation Based on Dynamic Time Warping," Transactions of the Japanese Society for Artificial Intelligence; vol. 18; No. 3C; pp. 144-152, no date.

* cited by examiner

*Primary Examiner*—Edward Raymond
*Assistant Examiner*—Mohamed Charioui
(74) *Attorney, Agent, or Firm*—Staas & Halsey LLP

(57) ABSTRACT

A computer-readable storage medium storing a data analysis program is used to direct a computer to perform the procedure of: receiving one or more time series cases of free correspondence including a plurality of data points each having one piece of time data and a plurality of attribute values, and an operation level indicating how each attribute works on a state of the time series case; and performing a data analysis using a processing system depending on the operation level.

6 Claims, 17 Drawing Sheets

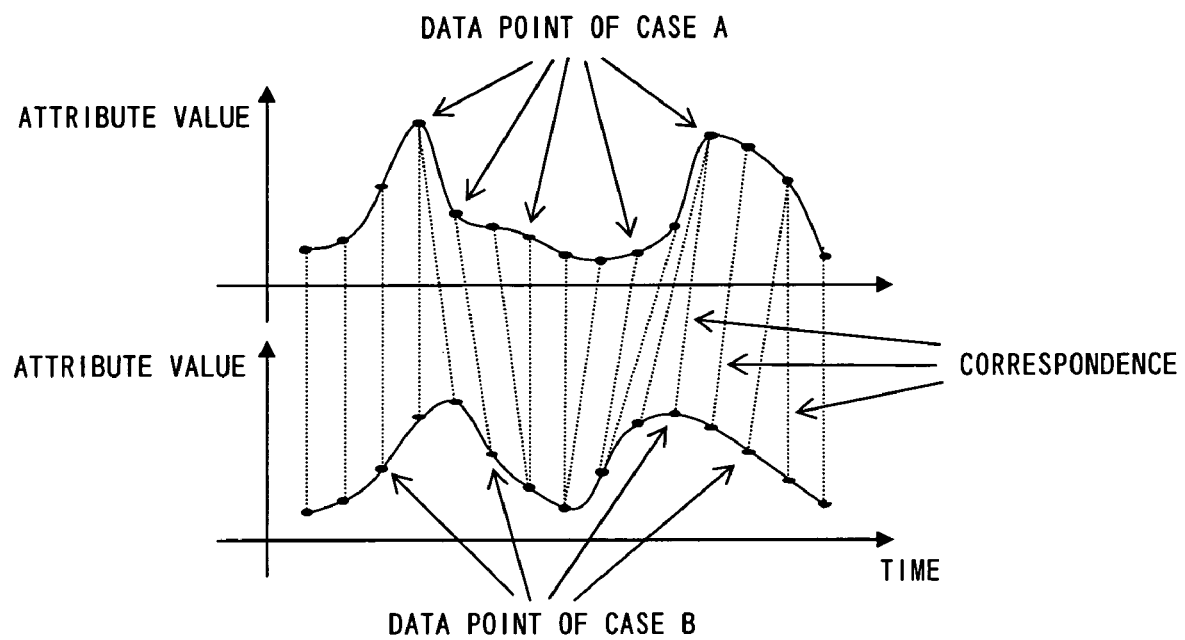
F I G. 1

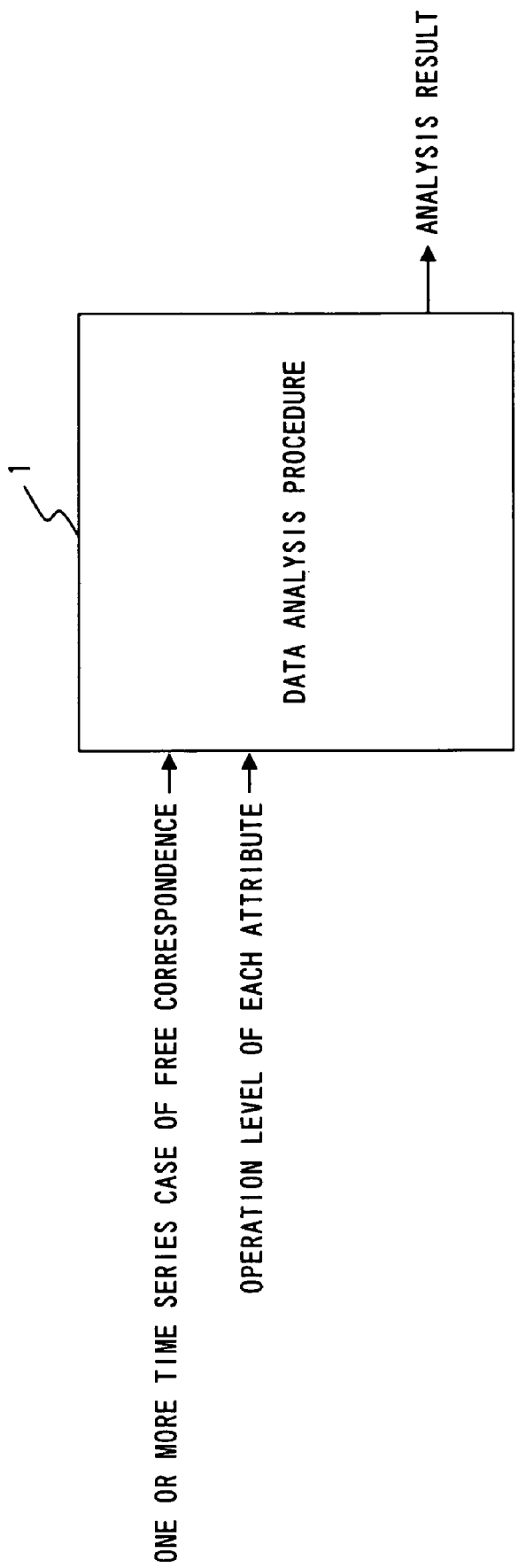
F I G. 2

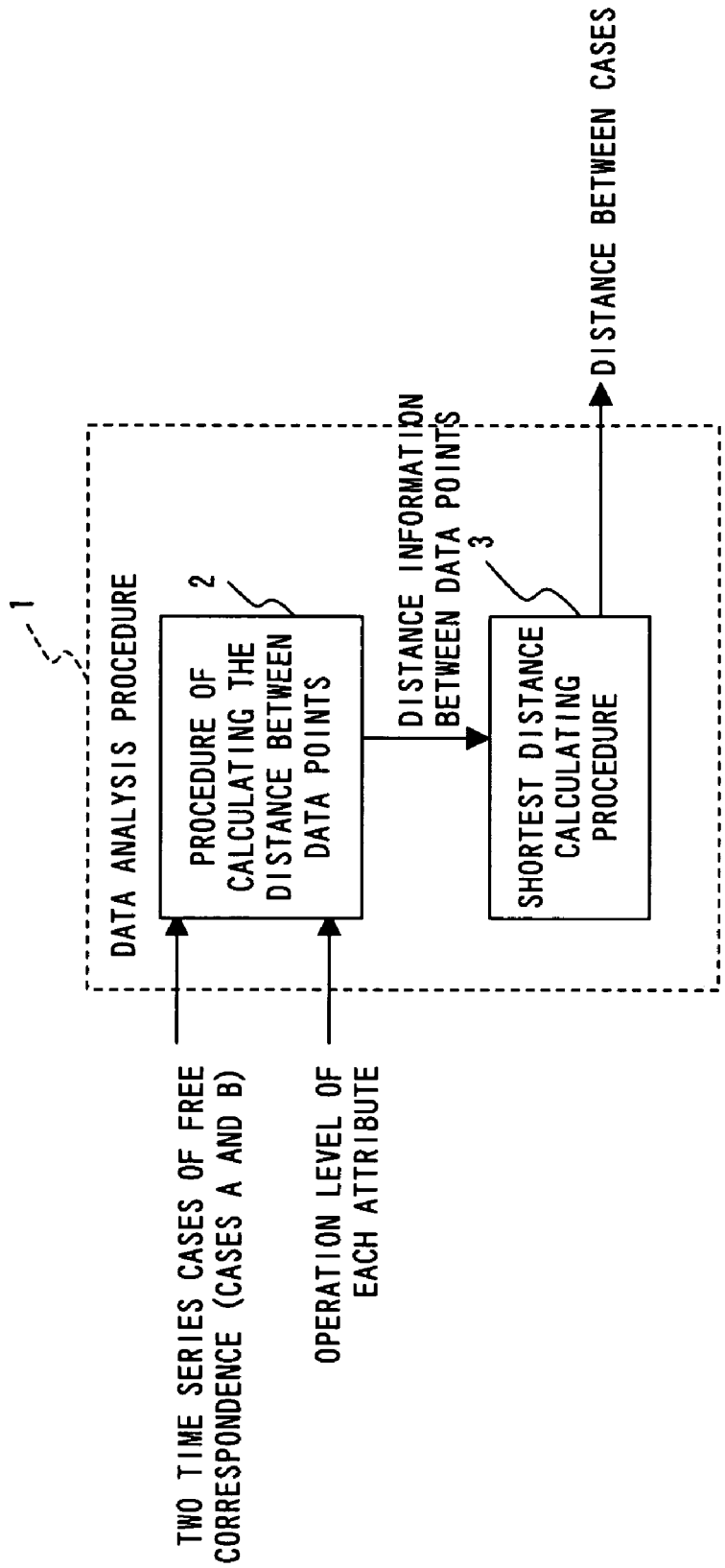
F I G. 4

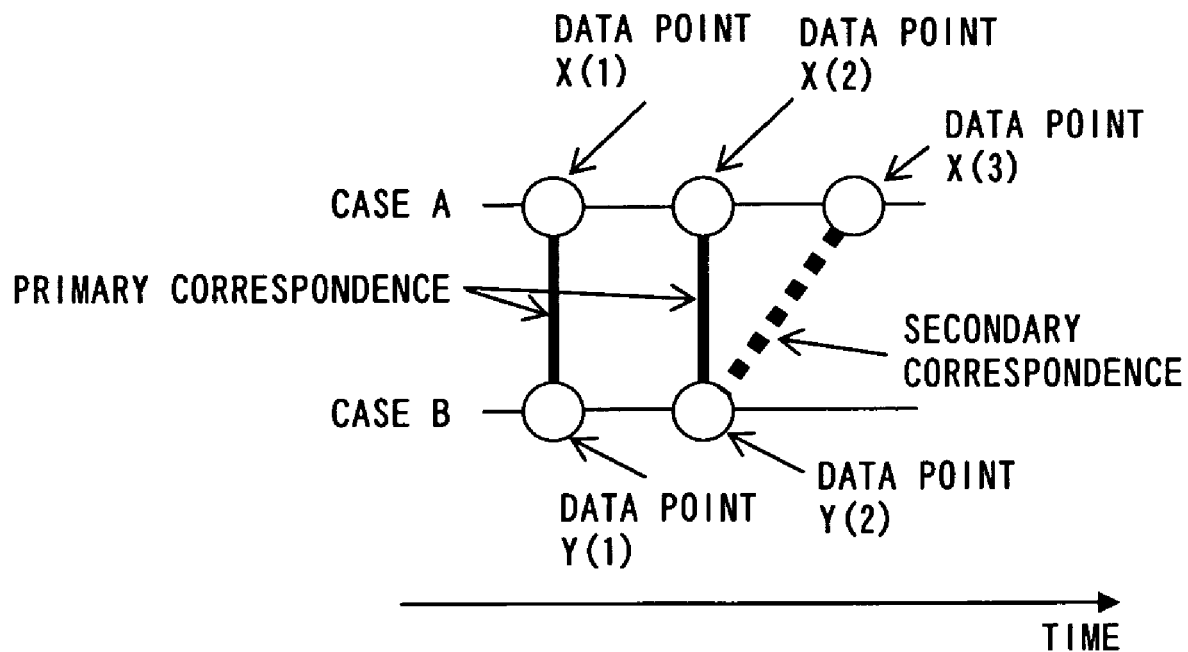
F I G. 7

PATIENT A

| DATA POINT NUMBER | DATE | CHECK RESULT | MEDICATION X |
|---|---|---|---|
| 1 | FIRST DAY | × | MEDICATION |
| 2 | THIRD DAY | × | NON-MEDICATION |

PATIENT B

| DATA POINT NUMBER | DATE | CHECK RESULT | MEDICATION X |
|---|---|---|---|
| 1 | FIRST DAY | × | MEDICATION |
| 2 | SECOND DAY | × | MEDICATION |
| 3 | THIRD DAY | × | NON-MEDICATION |

PATIENT C

| DATA POINT NUMBER | DATE | CHECK RESULT | MEDICATION X |
|---|---|---|---|
| 1 | FIRST DAY | × | MEDICATION |
| 2 | SECOND DAY | × | NON-MEDICATION |
| 3 | THIRD DAY | × | NON-MEDICATION |

FIG. 8

PRIMARY DISTANCE (DISTANCE BETWEEN ATTRIBUTES) OF MEDICATION X (VERTICAL AXIS INDICATING DATA POINT OF PATIENT A, AND HORIZONTAL AXIS INDICATING DATA POINT OF PATIENTS B AND C)

BETWEEN PATIENTS A AND B

| DATA POINT NUMBER | 1 | 2 | 3 |
|---|---|---|---|
| 1 | 0 | 0 | 1 |
| 2 | 1 | 1 | 0 |

BETWEEN PATIENTS A AND C

| DATA POINT NUMBER | 1 | 2 | 3 |
|---|---|---|---|
| 1 | 0 | 1 | 1 |
| 2 | 1 | 0 | 0 |

FIG. 9A

SECONDARY DISTANCE OF MEDICATION X (VERTICAL AXIS INDICATING DATA POINT OF PATIENT A, AND HORIZONTAL AXIS INDICATING DATA POINT OF PATIENTS B AND C)

BETWEEN PATIENTS A AND B

| DATA POINT NUMBER | 1 | 2 | 3 |
|---|---|---|---|
| 1 | 1 | 1 | 1 |
| 2 | 1 | 1 | 0 |

BETWEEN PATIENTS A AND C

| DATA POINT NUMBER | 1 | 2 | 3 |
|---|---|---|---|
| 1 | 1 | 1 | 1 |
| 2 | 1 | 0 | 0 |

F I G. 9 B

BETWEEN PATIENTS A AND B

TABLE α

| DATA POINT NUMBER | 1 | 2 | 3 |
|---|---|---|---|
| 1 | 0 | 2 | 4 |
| 2 | 3 | 2 | 1 |

TABLE β

| DATA POINT NUMBER | 1 | 2 | 3 |
|---|---|---|---|
| 1 | ∞ | 1 | 2 |
| 2 | ∞ | 4 | 2 |

TABLE γ

| DATA POINT NUMBER | 1 | 2 | 3 |
|---|---|---|---|
| 1 | ∞ | 2 | 8 |
| 2 | 1 | 3 | 4 |

TABLE δ

| DATA POINT NUMBER | 1 | 2 | 3 |
|---|---|---|---|
| 1 | 2 | 3 | 2 |
| 2 | 3 | 2 | 1 |

F I G. 1 0

BETWEEN PATIENTS A AND C

TABLE α

| DATA POINT NUMBER | 1 | 2 | 3 |
|---|---|---|---|
| 1 | 0 | 3 | 4 |
| 2 | 3 | 0 | 0 |

TABLE β

| DATA POINT NUMBER | 1 | 2 | 3 |
|---|---|---|---|
| 1 | ∞ | 1 | 2 |
| 2 | ∞ | 3 | 0 |

TABLE γ

| DATA POINT NUMBER | 1 | 2 | 3 |
|---|---|---|---|
| 1 | ∞ | 2 | 3 |
| 2 | 1 | 3 | 4 |

TABLE δ

| DATA POINT NUMBER | 1 | 2 | 3 |
|---|---|---|---|
| 1 | 2 | 3 | 2 |
| 2 | 3 | 0 | 0 |

F I G. 11

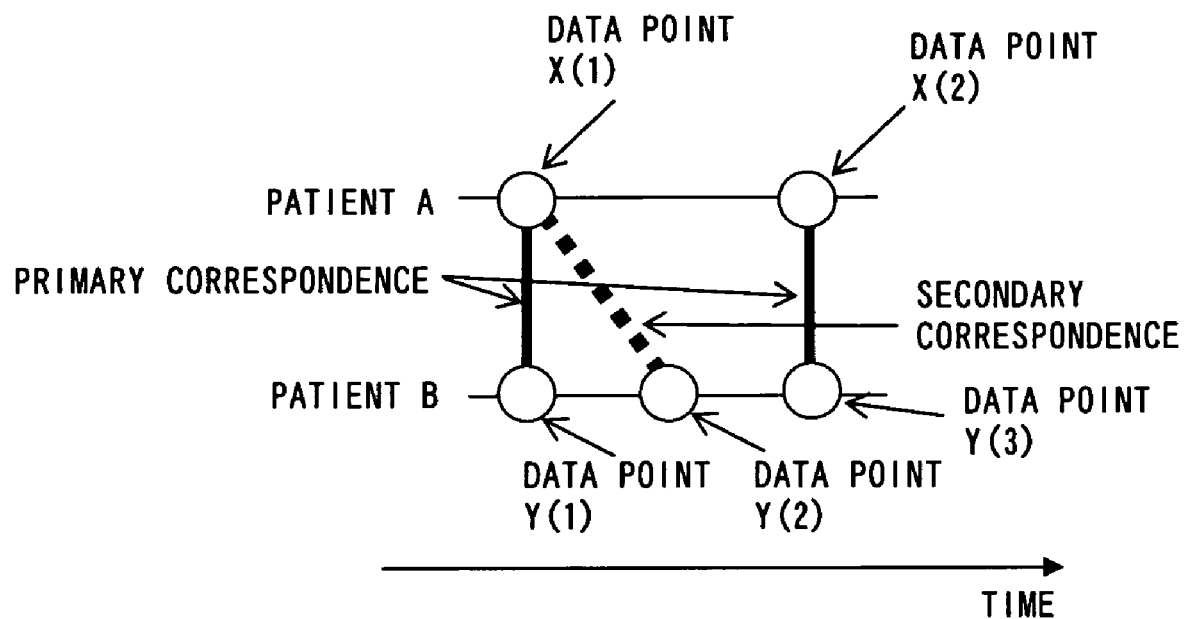
F I G. 1 2

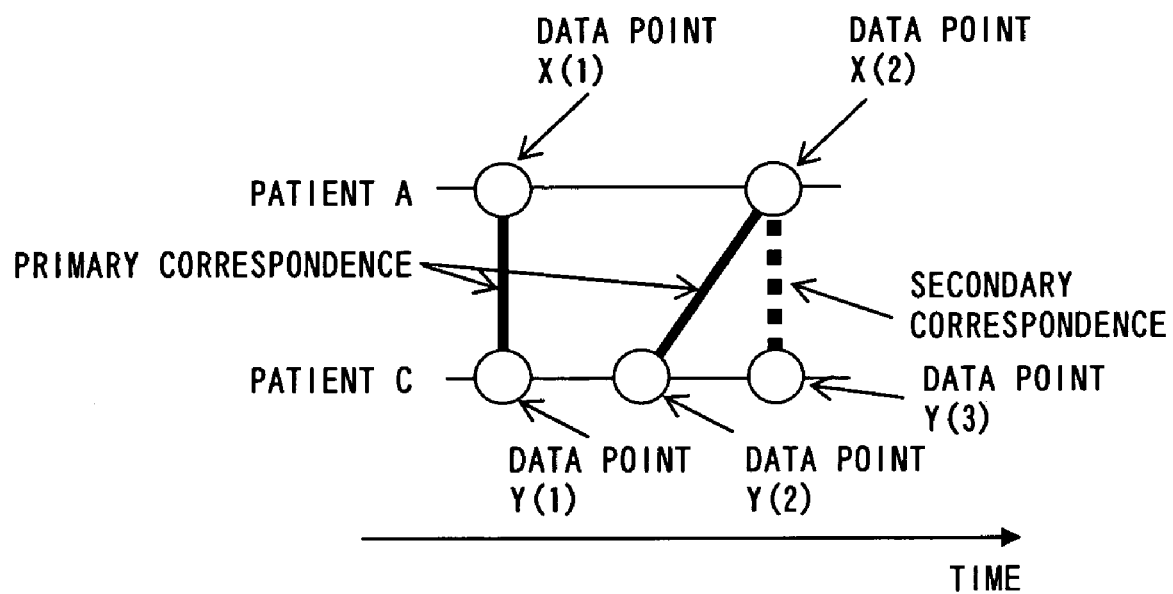
F I G. 1 3

| TIME | BODY HEAT | AMOUNT OF MEDICATION X |
|---|---|---|
| 6:00 | 38.0℃ | 10ml |
| 12:00 | 37.0℃ | NON-MEDICATION |
| 18:00 | 37.5℃ | 5ml |

FIG. 14A

| BODY HEAT | AMOUNT OF MEDICATION X |
|---|---|
| 37.5℃ | 15ml |

F I G. 1 4 B

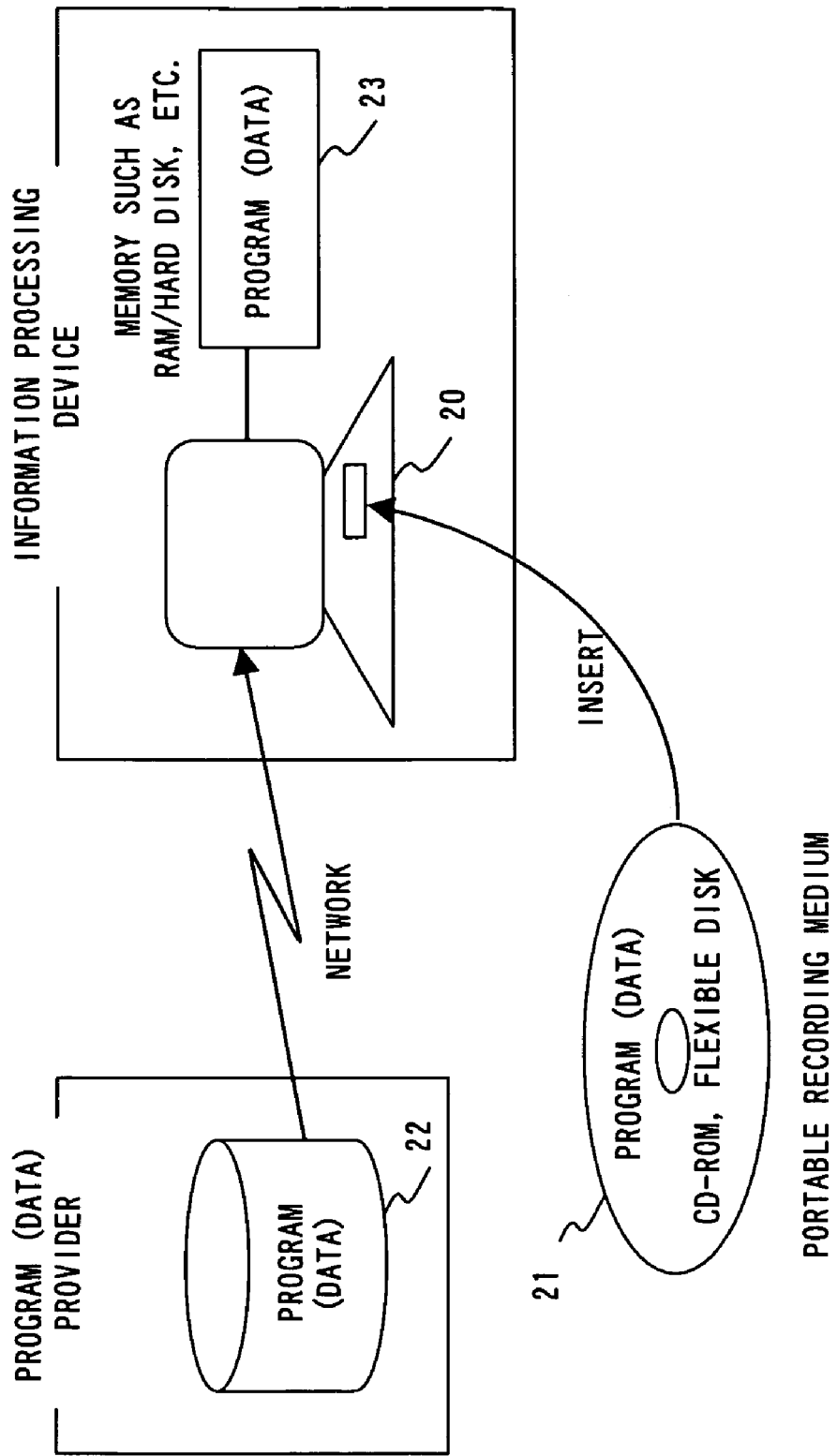
F I G. 15

COMPUTER-READABLE STORAGE MEDIUM STORING DATA ANALYSIS PROGRAM

BACKGROUND OF THE INVENTION

1. Field of the Invention

The present invention relates to the technology of analyzing time series data of free correspondence.

2. Description of the Related Art

With recent remarkable developments in networking represented by the Internet, high storage density, and higher-performance and lower-price computers, an enormously large amount of information can be accumulated. For example, in a POS (point of sale) system in the distribution industry, the sales contents of all shops in a nation can be centrally managed in the computer of the head office, etc., and the information is accumulated every moment as the correspondence between a sold article and the time it was sold. Other data such as the conditions of various production devices and yield data of generated products in the manufacturing industry, information about the use state of personal credit cards in the financial industry, information about the personal data of insurance subscribers and information about use state in the insurance industry, medical information, and network log data, etc. are also accumulated. Especially recently, data can be easily and automatically accumulated, and there are various fields in which a huge amount of time series data is accumulated. In this situation, there is an increasing demand for using the accumulated time series data and making the most of the data in business.

Conventionally, in analyzing time series data, the time series data is expressed as a time series case configured by a plurality of data points each having a piece of time data and a plurality of attribute values (category values or numerics), and a comparison is made between time series cases. In this case, a time series case is processed in the following two methods. However, for simple explanation, it is assumed that the time of the leading data point of each time series case has already been adjusted to 0 to make an easier comparison between time series cases.

Fixed Correspondence: The time interval between data points is predetermined and common to all time series cases, and no shift in the time direction (correspondence between the data points) is not allowed. Since it is apparent that the data point at the same time point of each time series case corresponds to each other, the correspondence between the data points is clear and the data analysis can be easily performed. However, there are strict restrictions on the data as described above, and an applicable area is small.

Free Correspondence: The time interval between data points is variable. The shift in the time direction (correspondence between data points at different time points) is permitted. Since the correspondence between the data points of the respective time series cases is not defined, it is difficult to perform appropriate analysis, but there are small restrictions on the data, and an applicable area is large. An example of a time series case of free correspondence can be a medical check and medication history, an article purchase history, a credit card use history, an ATM use history, a network log, etc. In a case of a time series case where logs are acquired at predetermined time intervals such as a sensor log of a manufacturing device in the manufacturing industry, the shift in the time direction can be allowed by processing the case as a time series case of free correspondence, thereby possibly realizing a more appropriate data analysis.

In the explanation below, a time series case of free correspondence having a larger application range (hereinafter a "time series case of free correspondence" is also referred to simply as a "case") is described as a target of a data analysis.

A data analysis of a case includes the steps of rule extraction of extracting and presenting a characteristic from a case, estimating and determining a label of a non-label case from a set of past labeled cases, clustering similar cases as a group, etc.

The calculation of a distance between cases is described below as one of the data analyses. The calculation of a distance between cases is one of the most fundamental data analyses, and can output quantitative information about how two given cases are similar to each other. By calculating the distance between a non-label case and all past cases, the above-mentioned determination can be made by returning the label of the past case closest in distance to the non-label case. Furthermore, by processing the cases having the shortest distance between cases as "similar" cases, the clustering process can be performed.

For calculating the distance between time series cases of free correspondence, the method for optimizing the correspondence between data points (hereinafter referred to as a "correspondence optimization method") represented by the DTW (dynamic time warping) method as described in, for example, the non-patent document 1 (by Kazuki Nakamoto and two partners, "Fast Clustering for Time-series Data with Average-time-sequence-vector Generation Based on Dynamic Time Warping" in the Transactions of the Japanese Society for Artificial Intelligence, Vol. 18 (2003), No. 3 Technical Papers, page 146-147) has been used. In this method, for example, a correspondence set having the shortest distance between cases (sum of the distance between data points of all correspondences) is obtained after allowing the retention of a plurality of correspondences by one data point (one-to-many correspondence) as shown in FIG. 1. In FIG. 1, the dotted line connecting the data point of a case A to the data point of a case B indicates the optimized correspondence between data points.

For an example of the conventional correspondence optimization method, the DTW method is explained below in detail using an example of a case of calculating the distance between the following cases A and B.

Problem: Assume that; the case A includes $n(A)$ data points, and the case B includes $n(B)$ data points; the i-th data point of the case A is $x(i)$; the j-th data point of the case B is $y(j)$; and there are k attributes defined. In addition, the values of the k-th attributes of $x(i)$ and $y(j)$ are respectively $a(i,k)$ and $b(j,k)$.

At this time, the optimum correspondence set between data points between the cases A and B and the distance are to be obtained in the DTW method. They can be obtained as follows.

1. First, the single distance between attributes $d(i,j,k)$ between $a(i,k) \cdot b(j,k)$ is calculated by the following equation (1) where $\sigma(k)$ is a parameter for normalizing the k-th attribute. For example, difference between the maximum value and minimum value of the attribute are used.

$$\text{distance between attributes } d(i, j, k) = \quad (1)$$

$$\begin{cases} \dfrac{|a(i,k) - b(j,k)|}{\sigma(k)} & \cdots \text{ (number attribute)} \\ \begin{cases} 0 & (a(i,k) = b(j,k)) \\ 1 & (a(i,k) \neq b(j,k)) \end{cases} & \cdots \text{ (category value attribute)} \end{cases}$$

2. Next, the distances between attributes are added up as shown in the following equation (2), and the distance between data points is obtained.

$$\text{distance between data points } D(i, j) = \sum_{k=1}^{K} d(i, j, k) \quad (2)$$

3. Then, the optimum correspondence set between data points is obtained.

In the DTW method, the correspondence set between data points has to satisfy the following two restriction conditions.

Each of all data points have at least one correspondence.
Correspondences do not cross.

The two restriction conditions are expressed by the following equation (3). However, it is considered that the m-th correspondence connects x(c(m)) to y(d(m)), and the correspondence set is formed by M correspondences.

c(1)=1 and c(M)=n(A), and d(1)=1 and d(M)=n(B), and c(m)−c(m−1)=0 or 1 and d(m)−d(m−1)=0 or 1 and c(m)−c(m−1)+d(m)−d(m−1)=1 or 2     (3)

where the distance D between cases is expressed by a sum of the distance between data points of all correspondences as expressed by the following equation (4). However, w(m) is a weight for maintaining the constant frequency of addition of D(c(m), d(m)) although M changes, and the equation (5) is frequently used.

$$D = \sum_{m=1}^{M} w(m) D(c(m), d(m)) \quad (4)$$

$$w(m) = \begin{cases} 1 & (m > 1 \text{ and } c(m) - c(m-1) + d(m) - d(m-1) = 1) \\ 2 & (m = 1 \text{ or } c(m) - c(m-1) + d(m) - d(m-1) = 2) \end{cases} \quad (5)$$

The optimum correspondence set brings about the minimum value of D in the equation (4) above, and the obtained D refers to the distance between cases. It is known that the optimum solution can be quickly obtained in the Dynamic Programming.

However, in the conventional correspondence optimization method, there has been a problem with some time series data to be processed because all attributes are equally processed. This problem is explained below with reference to time series data including a check result history and a medication history of a patient.

Practically, the true state of a patient changes every moment, and a check result is obtained as data after checking and observing a status at a certain time point. On the other hand, medication has nothing directly to do with the status of a patient at the time point, but rather affects the later status of the patient. However, in the conventional correspondence optimization method, they are equally processed.

In the one-to-many correspondence used in the conventional correspondence optimization method, the one-to-many correspondence is allowed. Therefore, the same process is performed equally on the case where the same values occur once and the case where the same values occur two or more times. However, the practical data contains in a mixed manner the attribute (observation attribute) indicative of the observation of a state such as a check result, etc. of time series data of a patient, and the attribute (operation attribute) working on a state such as a medication history, etc. Relating to the observation attribute, the allowance of a one-to-many correspondence is correct. However, relating to the operation attribute, a state has an influence each time it occurs. Therefore, the influence on a state depends on the number of occurrences, that is, between once and two or more times. Therefore, different processes are to be performed on them. However, the conventional correspondence optimization method has no concept of an operation attribute, and the entire attributes are processes as observation attributes, thereby failing in appropriately calculating a distance between cases.

As described above, there has been the problem the conventional method cannot perform an appropriate data analysis by equally processing an observation attribute and an operation attribute when time series data containing the observation attribute and the operation attribute in a mixed manner.

SUMMARY OF THE INVENTION

The present invention has been developed to solve the above-mentioned problem with the conventional method, and aims at providing a storage medium storing a program, an apparatus, and a method for appropriately performing a data analysis with an observation attribute and an operation attribute distinguished by specifying a parameter (operation level) for distinction between the observation attribute and the operation attribute.

To attain the above-mentioned objective, an aspect of the present invention is a computer-readable storage medium storing a data analysis program, and the data analysis program receives: one or more time series cases of free correspondence each being formed by a plurality of data points each having one piece of time data and a plurality of attribute values; and an operation level indicating how each attribute works on the state of the time series cases, and directs the computer to execute a data analysis procedure of performing a data analysis using a processing system depending on the operation level.

BRIEF DESCRIPTION OF THE DRAWINGS

FIG. 1 shows an example of optimizing a correspondence;

FIG. 2 is a block diagram of the function showing the principle of the data analysis program stored in the first storage medium according to the present invention;

FIG. 4 is a block diagram of the function showing the principle of the data analysis program stored in the third storage medium according to the present invention;

FIG. 7 shows an example of a correspondence between the cases A and B;

FIG. 8 shows the patient data among the patients A, B, and C;

FIG. 9A shows the primary distances (distance between attributes) of the operation attributes "medication X" between the patients A and B and between the patients A and C;

FIG. 9B shows the secondary distances of the operation attributes "medication X" between the patients A and B and between the patients A and C;

FIG. 10 shows four tables $\alpha$, $\beta$, $\gamma$, and $\delta$ between the patients A and B;

FIG. 11 shows four tables $\alpha$, $\beta$, $\gamma$, and $\delta$ between the patients A and C;

FIG. 12 shows the optimum correspondence set between the patients A and B;

FIG. 13 shows the optimum correspondence set between the patients A and C;

FIG. 14A shows the medical data of a patient for one day;

FIG. 14B shows a result of summarizing process; and

FIG. 15 shows an example of a recording medium.

DESCRIPTION OF THE PREFERRED EMBODIMENT

Figure 3:
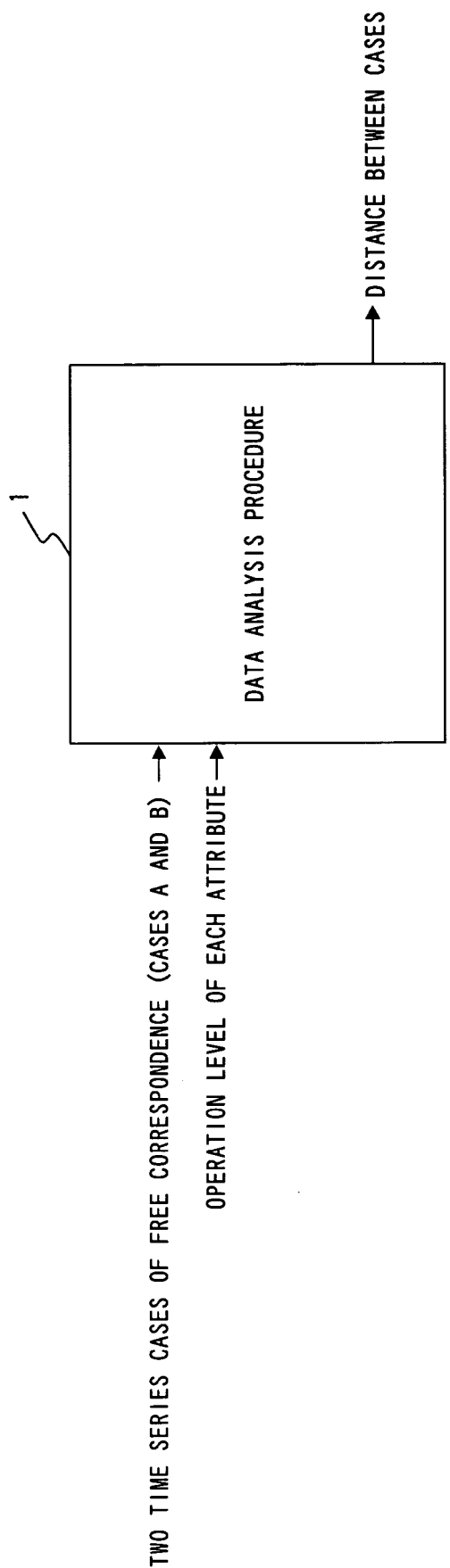
FIG. 3 is a block diagram of the function showing the principle of the data analysis program stored in the second storage medium according to the present invention.

First, the principle of the present invention is explained by referring to FIGS. 2 through 4.

FIG. 2 is a block diagram of the function showing the principle of the data analysis program stored in the first storage medium according to the present invention.

In FIG. 2, a data analysis procedure 1 receives one or more time series cases of free correspondence, and the operation level of each attribute, and performs a data analysis using a processing system depending on the operation level. A time series case of free correspondence is formed by a plurality of data points each having one piece of time data and a plurality of attribute values. The operation level of each attribute indicates how each attribute works on the state of the time series case.

FIG. 3 is a block diagram of the function showing the principle of the data analysis program stored in the second storage medium according to the present invention.

In FIG. 3, the data analysis procedure 1 receives two time series cases of free correspondence and the operation level of each attribute, obtains the optimum correspondence set between data points between the two cases, and obtains the distance between the two cases using a processing system depending on the operation level.

FIG. 4 is a block diagram of the function showing the principle of the data analysis program stored in the third storage medium according to the present invention.

In FIG. 4, the data analysis procedure 1 includes a procedure 2 of calculating the distance between data points and a shortest distance calculating procedure 3. The procedure 2 of calculating the distance between data points receives two time series cases of free correspondence and the operation level of each attribute, and calculates the distance of all combinations between data points between the cases using the distance calculating system depending on the operation level. The shortest distance calculating procedure 3 calculates the shortest distance between the cases using the distance of all combinations between data points calculated by the procedure 2 of calculating the distance between data points.

In the data analysis procedure 1 shown in FIG. 4, for example, the procedure 2 of calculating the distance between data points outputs the distance for the primary correspondence (when it is a one-to-one correspondence) and the distance for the secondary correspondence (when there is another correspondence that is a primary correspondence, and it is not a one-to-one correspondence) for each attribute of each combination of data points, and the shortest distance calculating procedure 3 can also obtain the shortest distance between the cases under the condition that one or less correspondence held by each data point is the primary correspondence, and the others are secondary correspondences.

The procedure 2 of calculating the distance between data points can also output the distance between the attributes of the cases as the distance for the primary correspondence, and can output the internally dividing value depending on the operation level relating to the attribute, between the distance obtained when the attribute values between the attributes of the cases are different and the distance for the primary correspondence, as the distance for the secondary correspondence.

The procedure 2 of calculating the distance between data points can output the value equal to the distance for the primary correspondence as the distance for the secondary correspondence when the attribute values of the attributes having positive operation levels of the data points in the combinations of the data points are non operation values not working on the state of a time series case.

The operation level of each attribute input to the data analysis procedure 1 shown in FIGS. 2 through 4 can be 0 or 1. Thus, a user can easily input an operation level.

The embodiments of the present invention are described below in detail by referring to the attached drawings.

The meanings of the terms used in this specification are described below.

Attribute: Type of information such as age, sex, etc.

Category value: Value represented by a character string such as "male", "female", etc. There is no ordinality.

Category value attribute: Attribute whose value is a category value.

Numeric attribute: Attribute whose value is a numeric. There is ordinality among values.

Data point: Set of a plurality of attribute values (category value or numeric) and one piece of time data.

Time series case; Set of data points.

Correspondence: Combination of data points of each of the different time series cases.

Correspondence set: Set of correspondences between two time series cases.

Time series case of free correspondence: Time series case having undefined correspondence set with other time series cases. The "time series case of free correspondence" is hereinafter also referred to simply as a "case" or a "time series case".

Distance between cases: Distance between cases under the optimum correspondence set.

Operation attribute: Attribute having an attribute value working on the state of a case.

Observation attribute: Attribute having an attribute value indicating the observation of the state of a case.

Operation level: Value indicating how the attribute works on the state of a case. If the value is 1, the attribute is an operation attribute. If it is 0, the attribute is an observation attribute.

Figure 5:
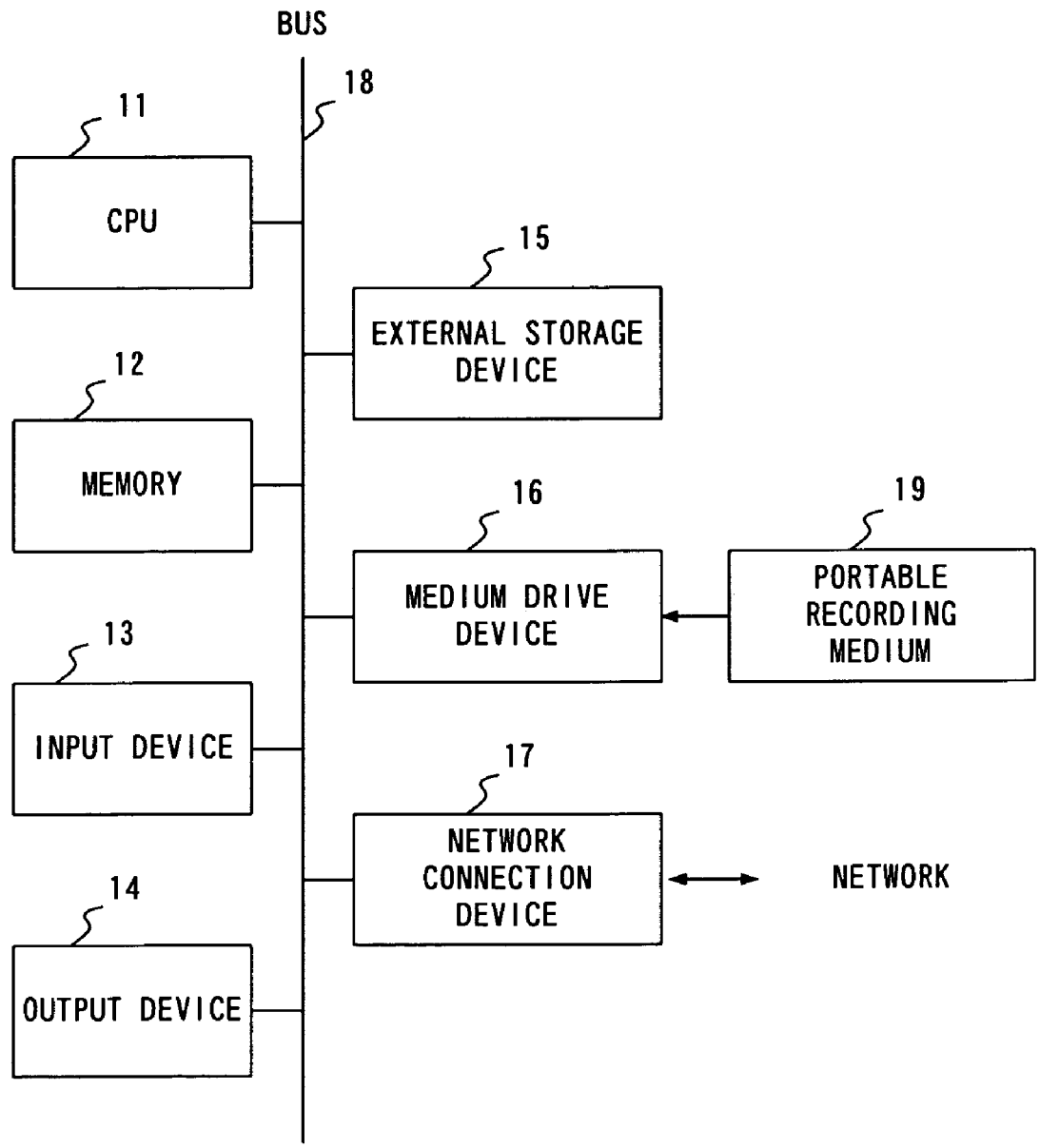
FIG. 5 shows the configuration of the data analysis device realized by the information processing device (computer) for performing the data analysis process according to the data analysis program of an embodiment of the present invention.

FIG. 5 shows the configuration of the data analysis device realized by the information processing device (computer) for performing the data analysis process according to the data analysis program of an embodiment of the present invention.

The data analysis device shown in FIG. 5 includes a CPU 11, memory 12, an input device 13, an output device 14, an external storage device 15, a medium drive device 16, and a network connection device 17. Each devices are interconnected via a bus 18.

The CPU 11 executes a data analysis program using the memory 12, and performs a data analysis process. The memory 12 can be, for example, RAM (random access memory), etc.

The input device 13 corresponds to, for example, a keyboard, a pointing device, etc., and is used for user input. For example, it is used by a user in inputting time series data and the operation level of each attribute described later in detail, etc. The output device 14 corresponds to a display device (display), a printer, etc., and is used in outputting a process result, etc.

The external storage device 15 can be, for example, a magnetic disk device, an optical disk device, an magneto-optical disk device, etc., and stores a program and data.

The medium drive device 16 drives a portable recording medium 19, and accesses its record contents. The portable recording medium 19 can be any computer-readable recording medium such as a memory card, a floppy disk, CD-ROM (compact disk read only memory), an optical disk, an magneto optical disk, etc. The portable recording medium 19 can store the above-mentioned data analysis program in addition to data.

The network connection device 17 is connected to any communication network such as a LAN (local area network), etc., and converts data, etc. for communications. The data analysis device can receive necessary data and program from an external database, etc. through the network connection device 17.

Described below is the data analysis process performed by the data analysis device.

The data analysis process receives one or more time series cases of free correspondence formed by a plurality of data points each having one piece of time data and a plurality of attribute values, and an operation level indicating how each attribute works on the state of a time series case, and performs a data analysis using the processing system depending on the operation level.

As an example of the data analysis process, using two cases (cases A and B) and the operation level of each attribute as input, the process of obtaining the optimum correspondence set between data points between the cases and obtaining the distance between cases using the processing system depending on the operation level is explained below by referring to FIG. 6.

In this example, it is assumed that the case A has n(A) data points, the case B has n(B) data points, the i-th data point of the case A is x(i), the j-th data point of the case B is y(j), the number of attributes is K, and the values of the k-th attributes of x(i) and y(j) are a(i,k) and b(j,k). The operation level of each attribute is assumed to be 0 or 1 with the easiness of user input taken into account. The data of the cases A and B and the operation level of each attribute is input by a user through, for example, the input device 13 in advance, stored in the external storage device 15, read as necessary from the external storage device 15, and used as input data for the data analysis process.

Figure 6:
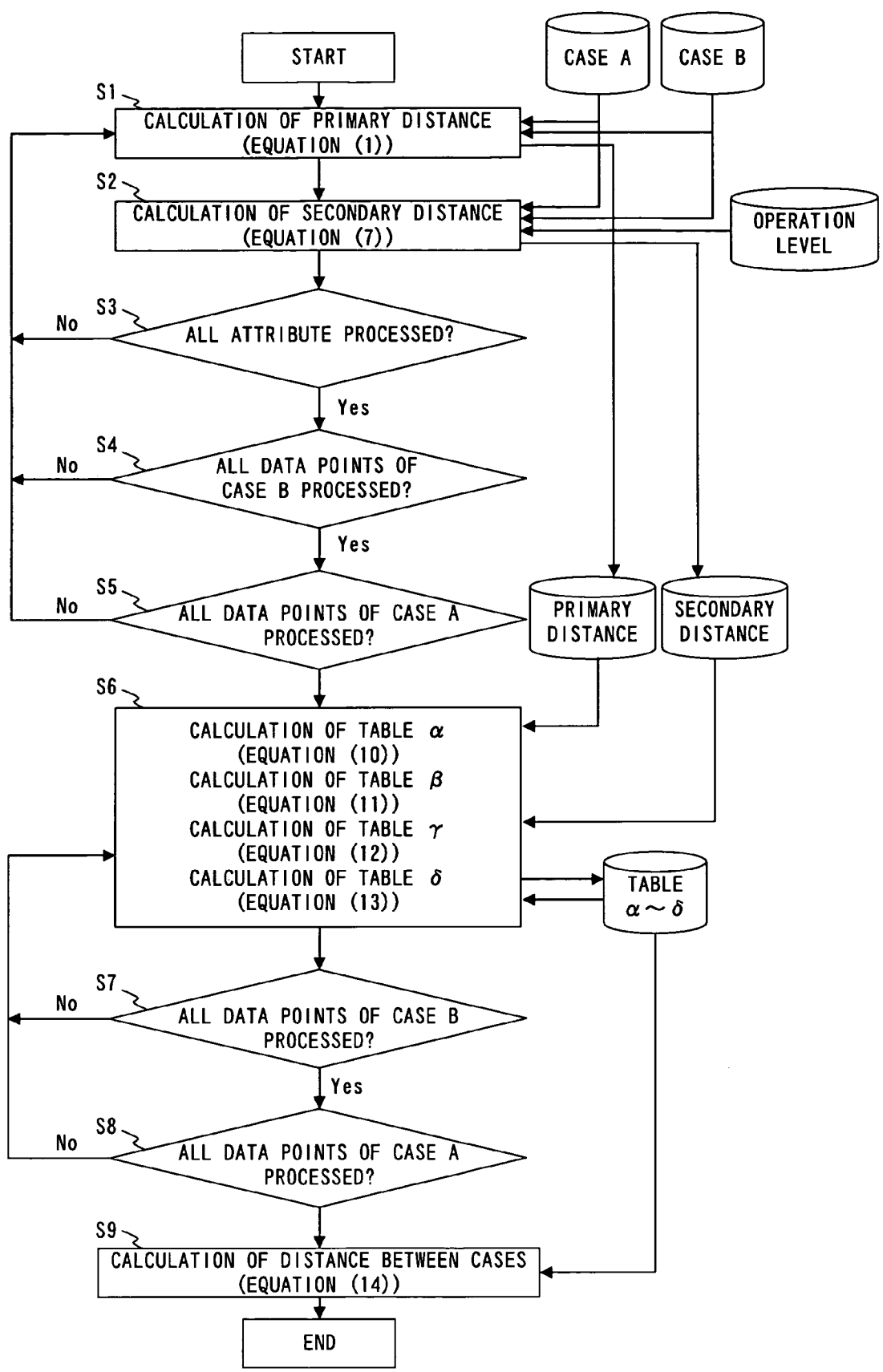
FIG. 6 is a flowchart of the process contents of the data analysis process.

FIG. 6 is a flowchart of the process contents of the data analysis process.

In FIG. 6, in S1 through S5, two cases A and B and the operation level of each attribute are input, and the process of calculating the distance between data points for calculating the distance between the all combinations of data points between the cases is performed using the distance calculating system depending on the operation level. For more details, the distance (primary distance) for the primary correspondence (when it is a one-to-one correspondence) and the distance (secondary distance) for the secondary correspondence (when there is another correspondence that is a primary correspondence, and it is not a one-to-one correspondence) for each attribute of each combination of data points are calculated and output.

First, in S1, using one attribute between one data point of the case A and one data point of case B as a process target, the primary distance for the process target is calculated by the above-mentioned equation (1) and output, and stored in the memory 12. In S2, the secondary distance for the process target is calculated using the operation level of the attribute of the process target the equation (7) described later and output, and then stored in the memory 12. In S3, it is determined whether or not the process has been completed on all attributes between the data points in the process target. If the determination result is NO, then one attribute to be processed is changed to an unprocessed attribute and control is returned to S1. If the determination result is YES, control is passed to S4. Then in S4, it is determined whether or not the process has been completed on all data points in the case B. If the determination result is NO, then one data point of the case B to be processed is changed to an unprocessed data point, and control is returned to S1. If the determination result is YES, control is passed to S5. Then, in S5, it is determined whether or not the process has been completed on all data points of the case A. If the determination result is NO, one data point of the case A to be processed is change to an unprocessed data point, and control is returned to S1. If the determination result is YES, then control is passed to S6.

However, in the output of the primary distance in S1 and the output of the secondary distance in S2, a distance between attributes is output as a primary distance and a distance equal to or exceeding the primary distance is output as a secondary distance for an attribute (operation attribute) having a positive operation level. The same values are output as the primary and secondary distances for an attribute (observation attribute) having an operation level of 0. This means that the attribute having a positive operation level provides a penalty for a one-to-many correspondence.

FIG. 7 shows an example of a correspondence. In the example shown in FIG. 7, since the correspondence between the data points x(1) and y(1) is 1:1, it is a primary correspondence. Since there are two correspondences for the data point y(2), one correspondence is a primary correspondence between the data points x(2) and y(2), and the other is a secondary correspondence between the data points x(3) and y(2).

Practically in the distance calculating process between data points in S1 through S5, the distance (d(i,j,k) in the equation (1) above) between attributes of the cases are calculated and output as a primary distance in S1. Practically in S2, an internally dividing value depending on the operation level relating to the attribute between the primary distance and the distance obtained when the attribute values of the cases are different is calculated and output as a secondary distance (when the primary distance is equal to or longer than the secondary distance, the internally dividing value equal to the primary distance is used). In this example, the distance obtained when the attributes of the cases are different is assumed to be 1. At this time, assuming that the operation level of the k-th attribute is e(k), the secondary distance f(i,j,k) of the k-th attribute between the data points x(i) and y(j) is expressed by the following equation (6).

$$f(i, j, k) = \begin{cases} d(i, j, k)(1 - e(k)) + e(k) & (d(i, j, k) < 1)) \\ d(i, j, k) & (d(i, j, k) \geq 1) \end{cases} \quad (6)$$

Thus, when the attribute is an observation attribute (e(k)=0), the secondary distance equals the primary distance. If it is an operation attribute (e(k)=1), the secondary distance is constantly 1 (however, when the primary distance is 1 or more, the secondary distance equals the value of the primary distance). That is, when the attribute is an observation attribute, the system is the same as the conventional system. When the attribute is an operation attribute, the secondary distance is constantly equal to or longer than the primary distance, and the secondary distance is a penalty to the primary distance.

However, in the calculation of the secondary distance, when the attribute value of any data point of a correspondence is a non-operational value (attribute value not working on the state of a case for an operation attribute), the secondary distance equal to the value of the primary distance is output. Therefore, the secondary distance f(i,j,k) expressed by the equation (6) above is finally expressed by the equation (7).

$$f(i, j, k) = \begin{cases} d(i, j, k) & (a(i, k) \text{ and } b(j, k) \text{ are non-operational values}) \\ \text{same as the equation (6)} & (a(i, k) \text{ or } b(j, k) \text{ is not a non-operational value}) \end{cases} \quad (7)$$

Since a non-operational value does not affect the state although it occurs frequently, as with the observation attribute, a one-to-many correspondence can be configured for an operation attribute having a non-operational value as an attribute value. By the equation (7) above, when an attribute value is a non-operational value, an operation attribute and an observation attribute are processed similarly, and the one-to-many correspondence is realized without penalty.

Thus, when the distance calculating process between data points is performed in S1 through S5, the primary distance and the secondary distance for each attribute of each combination of data points between cases A and B are stored in the memory 12 (distances between the all combinations of data points between the cases A and B are stored in the memory 12).

When the distance calculating process between the data points is completed, the shortest distance calculating process of calculating the shortest distance between the cases is performed using the primary distance and the secondary distance for each attribute of the combinations of the data points between the cases A and B in S6 through S9. For more details, the shortest distance between the cases is calculated under the condition that, among the correspondences held by each data point, one or less is a primary correspondence, and the others are secondary correspondences.

At this time, the optimum correspondence set between the data points used when the shortest distance between the cases is calculated makes the smallest D in the equation (8) below under the equation (3) above (however, the selection of a primary correspondence is included in the optimization of a correspondence). The D obtained at this time indicates a distance between cases, that is, the shortest distance between the cases, where w(m) is similar to that in the DTW method above, and, for example, the equation (5) above is used.

$$D = \sum_{m=1}^{M} w(m) \begin{cases} \sum_{k=1}^{K} d(c(m), d(m), k) & (m-th \text{ correspondence is primary correspondence}) \\ \sum_{k=1}^{K} f(c(m), d(m), k) & (m-th \text{ correspondence is secondary correspondence}) \end{cases} \quad (8)$$

The minimum value of D in the equation (8) can also be obtained using the Dynamic Programming.

In the present embodiment, the explanation is given by assuming that the primary correspondence and the secondary correspondence are determined for each correspondence, but the primary correspondence and the secondary correspondence can be changed for each attribute.

In the shortest distance calculating process in S6 through S9, the distance between cases for the optimum correspondence set between the data points that minimizes the value of D in the equation (8) above practically is obtained by generating four tables α, β, γ, and δ which refer to the data points of the case A for a vertical axis, and the data points of the case B for the horizontal axis, and performing calculation based on the four tables.

First, in S6, a data point of the case A and a data point of the case B are defined as process targets, each component of the tables α, β, γ, and δ in the process target is calculated by the equations (10), (11), (12), and (13) described later and output, and stored in the memory 12. However, the calculation of each component is performed using primary distance and the secondary distance calculated by the distance calculation process between the data points in S1 through S5 and the calculated components of the tables α, β, γ, and δ stored in the memory 12. In S7, it is determined whether or not the process has been completed on all data points of the case B. If the determination result is NO, one data point of the case B to be processed is changed to an unprocessed data point, and control is returned to S6. If the determination result is YES, control is passed to S8. In S8, it is determined whether or not the process has been completed on all data points of the case A. If the determination result is NO, one data point of the case A to be processed is changed to an unprocessed data point, and control is returned to S6. If the determination result is YES, control is passed to S9. If it is YES in S8, all components of the tables α, β, γ, and δ are stored in the memory 12, and the tables α, β, γ, and δ are completed. In S9, the distance between the cases A and B is calculated by the equation (14) described later from the components of the completed tables α, β, γ, and δ.

The shortest distance calculating process in S6 through S9 is practically explained below by referring to the equations (10) through (13).

In the explanation below, [ ] refers to adopting a smaller result after the calculation of all cases involved. For example, when g includes [αβ], g of the case α and g of the case β are calculated, and the smaller g is adopted. If the second or third parameter of g is 0, it is not processed as the smallest, but is processed as ∞.

In S6 through S8, the tables α, β, γ, and δ having the vertical axis as the data points of the case A and the horizontal axis as the data points of the case B are generated by the calculation explained below.

The calculation completed up to the intermediate step in the equation (8) is g(x,y), the following expression holds.

$$g(x, y) = \min \sum_{m=1}^{J} w(m) \begin{cases} \sum_{k=1}^{K} d(c(m), d(m), k) & (m-th \text{ correspondence is primary correspondence}) \\ \sum_{k=1}^{K} f(c(m), d(m), k) & (m-th \text{ correspondence is secondary correspondence}) \end{cases} \quad (9)$$

where x=c(J), y=d(J).

The four tables α, β, γ, and δ are divided depending on whether or not the last data point c(J), d(J) of each case has already held primary correspondence. Assuming that g(x,y) of tables α, β, γ, and δ are respectively g(α,x,y), g(β,x,y), g(γ,x,y), g(δ,x,y), each table can be calculated and generated as follows.

TABLE α

The last data point of the case A holds a primary correspondence, and the last data point of the case B holds a primary correspondence.

$g(α, 1, 1) = 2d(1, 1)$ (10)

$$g(α, x, y) = \min \begin{cases} g([αβγδ]), x-1, y-1) + 2d(x, y) \\ g([βδ]), x-1, y) + d(x, y) \ (x > 1 \text{ or } y > 1) \\ g([γδ]), x, y-1) + d(x, y) \end{cases}$$

TABLE β

The last data point of the case A holds a primary correspondence, and the last data point of the case B does not hold a primary correspondence.

$g(β, 1, 1) = ∞$ (11)
$g(β, x, y) = \min\{g([αβ]), x, y-1) + f(x, y) \ (x > 1 \text{ or } y > 1)\}$

TABLE γ

The last data point of the case A does not hold a primary correspondence, and the last data point of the case B holds a primary correspondence.

$g(γ, 1, 1) = ∞$ (12)
$g(γ, x, y) = \min\{g([αγ]), x-1, y) + f(x, y) \ (x > 1 \text{ or } y > 1)\}$

TABLE δ

The last data point of the case A does not hold a primary correspondence, and the last data point of the case B does not hold a primary correspondence.

$g(δ, 1, 1) = 2f(1, 1)$ (13)

$$g(δ, x, y) = \min \begin{cases} g([αβγδ]), x-1, y-1) + 2f(x, y) \\ g([γδ]), x-1, y) + f(x, y) \ (x > 1 \text{ or } y > 1) \\ g([βδ]), x, y-1) + f(x, y) \end{cases}$$

Each component of the four tables α, β, γ, and δ can be sequentially calculated by the equations (10) through (13) above from upper left to lower right.

In the generating process of the four tables α, β, γ, and δ, the primary distance (d(x,y)) and the secondary distance (f(x, y)) used in the calculation by the equations (10) through (13) are read from the memory 12 after being stored in the distance calculating process between the data points in S1 through S5. In the generating process, each component of each table obtained by the calculation is sequentially stored in the memory 12, and read from the memory 12 during the calculation in the equation (10) through (13) above as necessary.

Thus, in the process in S6 through S8, all components of the four tables α, β, γ, and δ are calculated, the memory 12 stores the generated four tables α, β, γ, and δ. In S9, the shortest distance between the cases is calculated by the following equation (14) from the four tables α, β, γ, and δ.

$g(n(A),n(B))=\min \{g([αβγδ],n(A),n(B))\}$ (14)

The g(n(A) ,n(B)) apparently equals D in the equation (8) above, and the shortest distance between the cases A and B is obtained. The optimum correspondence set between the cases can be obtained from the four tables α, β, γ, and δ.

Then, the difference between the data analysis process shown in FIG. 6 and the conventional process is explained below by referring to the patient data including the check result history and the medication history.

In this example, a comparison is made using an example of the following problem.

Problem: When the observation attribute is a "check result", and the operation attribute is "medication X" in the patient data (time series case) of the patients A, B, and C shown in FIG. 8, the distances between the patients A and B and between the patients A and C are calculated. In the "medication X", it is assumed that "non-medication" is a non-operational value.

In this case, the patients A and C take medicine X once while the patient B takes it twice. Since the patients are equal in "check result" of "x", it is desired to obtain the result that the distance between the patients A and B is shorter than the distance between the patients A and C, that is, the patient A is similar to the patient C than to the patient B.

When the shortest distances between the patients A and B and between the patients A and C are obtained according to the data analysis process shown in FIG. 6, the calculating process is performed as follows.

First, for each attribute of each combination of data points between the patients A and B and between the patients A and C, the primary distance (distance between attributes) and the secondary distance are calculated.

The primary distance and the secondary distance of the observation attribute "check result" between the patients A and B and between the patients A and C are always 0 between all data points according to the equations (1) and (7) above because the "check result" of each patient is constantly "x".

For example, the primary distance of the observation attribute "check result" between the data point (1) of the patient A and the data point (1) of the patient B is 0 from the equation (1) above because the attribute values of the data points are equally "x". The primary distance between the other data points between the patients A and B and the primary distance between the data points between the patients A and C are similarly 0.

In addition, for example, the secondary distance of the observation attribute "check result" between the data point (1) of the patient A and the data point (1) of the patient B is also 0 as with the primary distance by $f(1,1,k)=d(1,1,k)$ $(1-0)+0$, that is, $f(1,1,k)=d(1,1,k)$, from the equation (7) (equation (6)) above because the "check result" is an observation attribute (operation level: $e(k)=0$), and the primary distance between the data points is 0. The secondary distance between the other data points between the patients A and B and the secondary distance between the data points between the patients A and C are similarly 0.

On the other hand, the primary distances of the operation attribute "medication X" between the patients A and B and between the patients A and C are as shown in the table shown in FIG. 9A by the equation (1) above, and the secondary distance of "medication X" is as shown in the table shown in FIG. 9B by the equation (7) above. In FIGS. A and B, the vertical axis is the data point (x(i)) of the patient A, and the horizontal axis is the data point (y(j)) of the patient B or C.

For example, in FIG. 9A, the primary distance of the operation attribute "medication X" between the data point (1) of the patient A and the data point (1) of the patient B is 0 by the equation (1) above because the attribute values of the data points are equally "medication". The primary distance of the operation attribute "medication X" between the data point (2) of the patient A and the data point (1) of the patient B is 1 by the equation (1) above because the attribute values of the data points are different, that is, "non-medication" and "medication". The primary distance between other data points between the patients A and B and the primary distance between the data points between the patients A and C can be similarly obtained.

For example, in FIG. 9B, the secondary distance of the operation attribute "medication X" between the data point (1) of the patient A and the data point (1) of the patient B is 1 by $f(1,1,k)=d(1,1,k)(1-1)+1$ from the equation (7) (equation (6)) above because "medication X" is an operation attribute (operation level: $e(k)=1$), both attribute values are non-operational values, and the primary distance between the data points is 0. The secondary distance of the operation attribute "medication X" between the data point (1) of the patient A and the data point (3) of the patient B is 1 as with the primary distance by the equation (7) (equation (6)) above because "medication X" is an operation attribute (operation level: $e(k)=1$), only the attribute value of the patient B is a non-operational value, and the primary distance between the data points is 1. In addition, the secondary distance of the operation attribute "medication X" between the data point (2) of the patient A and the data point (3) of the patient B is 0 as with the primary distance by $f(2,3,k)=d(2,3,k)$ from the equation (7) above because "medication X" is an operation attribute (operation level: $e(k)=1$), both attribute values are non-operational values, and the primary distance between the data points is 0. The secondary distance between the other data points between the patients A and B and the secondary distance between the data points between the patients A and C can be similarly obtained.

Next, the four tables α, β, γ, and δ between the patients A and B and between the patients A and C are generated by performing calculation by the equations (10), (11), (12), and (13) above. In this case, the four tables α, β, γ, and δ between the patients A and B are expressed by the tables as shown in FIG. 10. The four tables α, β, γ, and δ between the patients A and C are expressed by the tables as shown in FIG. 11. In FIGS. 10 and 11, the vertical axis is the data point (x(i)) of the patient A, and the horizontal axis is the data point (y(j)) of the patient B or C.

For example, in FIG. 10, $g(α,1,1)$ (a component of the table α at the data point (1) of the patient A and the data point (1) of the patient B) is $2d(1,1)=2*0=0$ by the equation (10) above, where $d(1,1)$ is 0 from the primary distance between the data point (1) of the patient A and the data point (1) of the patient B shown in FIG. 9A. Similarly, $g(β,1,1)$ (a component of the table β at the data point (1) of the patient A and the data point (1) of the patient B) is ∞ by the equation (11) above, and $g(γ,1,1)$ (a component of the table γ at the data point (1) of the patient A and the data point (1) of the patient B) is ∞ by the equation (12) above. In addition, $g(δ,1,1)$ (a component of the table δ at the data point (1) of the patient A and the data point (1) of the patient B) is $2f(1,1)=2*1=2$ by the equation (13) above, where $f(1,1)$ is 1 from the secondary distance between the data point (1) of the patient A and the data point (1) of the patient B shown in FIG. 9B. In the calculation of $g(α,1,2)$ (a component of the table α at the data point (1) of the patient A and the data point (2) of the patient B), $g([γδ],x,y-1)+d(x,y)$ is applied in the equation (10) above because x and y are 1 and 2 at this time, and x=1, y=2 is assigned to $g([γδ],x,y-1)+d(x,y)$, thereby $g(α,1,2)$ is obtained from $g([γδ], 1,1)+d(1,2)$. Since $g(γ,1,1)=∞$, $g(δ,1,1)=2$, smaller value of $g(δ,1,1)=2$ is applied, and $g(α,1,2)$ equals $g([γδ],1,1)+d(1,2)=2+0=2$. Since $d(1,2)$ is 0 from the primary distance between the data point (1) of patient A and the data point (2) of the patient B shown in FIG. 9A. And $g(β,1,2)$ (a component of the table δ between the data point (1) of the patient A and the data point (2) of the patient B) is obtained from $g([αβ],1,1)+f(1,1)$ by the equation (11) above because x and y are 1 and 2 at this time. Since $g(α,1,1)=0$, $g(β,1,1)=∞$, the smaller value of $g(α,1,1)=0$ is applied, and $g(β,1,2)$ equals $g([αδ],1,1)+f(1,1)=0+1=1$, where $f(1,1)$ is 1 from the secondary distance between the data point (1) of the patient A and the data point (1) of the patient B shown in FIG. 9B. Similarly, each of the remaining components of the four tables α, β, γ, and δ between the patients A and B and each of the components of the four tables α, β, γ, and δ between the patients A and C shown in FIG. 11 can be obtained by the equation (10) through (13).

The shortest distance between the patients A and B is obtained from the generated four tables α, β, γ, and δ (FIG. 10) between the patients A and B by the calculation by the equation (14) above, and the shortest distance between the patients A and C is obtained from the generated four tables α, β, γ, and δ (FIG. 11) by the calculation by the equation (14) above. In this case, the shortest distance D between the patients A and B is the value of the component smallest for the data point (2) of the patient A and the data point (3) of the patient B in the tables α, β, γ, and δ shown in FIG. 10, and the shortest distance D between the patients A and C is the value of the component smallest for the data point (2) of the patient A and the data point (3) of the patient C in the tables α, β, γ, and δ shown in FIG. 11. That is, the following equations hold.

Shortest distance D between the patients A and B:

$$D=\min\{g([\alpha\beta\gamma\delta],2,3)\}=\min\{1,2,4,1\}=1$$

Shortest distance D between the patients A and C:

$$D=\min\{g([\alpha\beta\gamma\delta],2,3)\}=\min\{0,0,4,0\}=0$$

Thus, when the value is obtained in the data analysis process shown in FIG. 6, the distance between cases between the patients A and B is 1 with the optimum correspondence set, for example, M=3,c(1)=d(1)=1,c(2)=1,d(2)=2,c(3)=2,d(3)=3 as shown in FIG. 12, and with the first correspondence and the third correspondence defined as the primary correspondence. The distance between cases between the patients A and C is 0 with the optimum correspondence set, for example, M=3,c(1)=d(1)=1,c(2)=2,d(2)=2,c(3)=2,d(3)=3 as shown in FIG. 13, and with the first correspondence and the second correspondence defined as the primary correspondence. The optimum correspondence set between the patients A and B is obtained from the four tables α, β, γ, and δ as shown in FIG. 10, and the optimum correspondence set between the patients A and C is obtained from the four tables α, β, γ, and δ as shown in FIG. 11.

On the other hand, when the conventional process is performed, although the calculating process is omitted here, according to the equations (1) through (5) above, the distance between cases between the patients A and B is 0 with the optimum correspondence set expressed by M=3,c(1)=d(1)=1,c(2)=1,d(2)=2,c(3)=2,d(3)=3. The distance between cases between the patients A and C is 0 with the optimum correspondence set expressed by M=3,c(1)=d(1)=1,c(2)=1,d(2)=2,c(3)=2,d(3)=3.

Thus, when the process results are compared between the data analysis process shown in FIG. 6 and the conventional process, the optimum correspondence sets are the same between the processes, but the distance between cases is 1 between the patients A and B and 0 between the patients A and C in the data analysis process shown in FIG. 6 while it is 1 between the patients A and B and between the patients A and C in the conventional process.

In the data analysis process shown in FIG. 6, the distance between cases is 1 between the patients A and B as shown in FIG. 12 because one of the two correspondences held by the data points x(1) of the patient A is secondary correspondence. This indicates the difference detected between the "medication" for once and the "medication" for twice. On the other hand, between the patients B and C, the secondary distance between the data point x(2) of the patient A and the data point y(2), y(3) of the patient C is 0 because of a non-operational value for "non-medication" as shown in FIG. 13. Therefore, the distance between cases is 0. This means the "non-medication" for once is equivalent to the "non-medication" for twice.

Thus, the equal distances are output without detecting that the frequency of the medication for the patient B is higher than the frequency for the patient A in the conventional process. However, in the data analysis process shown in FIG. 6, the difference in medication frequency can be detected, and an appropriate data analysis that the distance between the patients A and C is shorter than the distance between the patients A and B, that is, the patient A is similar to the patient C rather than patient B, can be obtained.

In the above-mentioned example, there are a plurality of cases in the data analysis process. However, only one case can be processed in the process. That is, in the data analysis process performed by the above-mentioned data analysis device, one case and an operation level indicating how each attribute works on the state of the case are input to make a data analysis using a processing system depending on the operation level. Described below is an example of the data analysis process.

In this example, the following case is assumed. That is, as shown in FIG. 14A, one-day medical data for a patient including a "body heat" and an "amount of medication X" as attributes, and 0 (observation attribute) and 1 (operation attribute) as the respective operation levels of the "body heat" and the "amount of medication X" are input, and the one-day data is summarized as a data analysis using the processing system depending on the operation level.

In this case, since the average value is significant in "body heat" as an observation attribute, the average value is output as a result of summarizing. On the other hand, the average value is not significant in "amount of medication X" as an operation attribute, but the total value is significant. Therefore, the total value is output as a result of summarizing. That is, in this case, the data analysis device performs different processes between the observation attribute and the operation attribute, and outputs the results of summarizing as shown in FIG. 14B to the output device 14.

Thus, the data analysis device can obviously perform a data analysis by the processing system depending on the operation level although the number of input cases is only one.

The present invention has been described above in detail, but it is not limited to the above-mentioned embodiments, but can be improved and changed within the scope of the gist of the present invention.

For example, the operation level of each attribute is defined 0 or 1 with the easy input by a user taken into account. Otherwise, another value can be used as the operation level of each attribute.

According to the embodiments of the present embodiment, in an information processing device as the above-mentioned data analysis device, the data analysis program executed by the CPU 11 is assumed to be stored in the portable recording medium 19, but the recording medium storing the data analysis program is not limited. For example, as shown in FIG. 15, in addition to a portable recording medium 21 removable from a medium drive device 20 such as CD-ROM, and FD (or MO, DVD, a removable hard disk, etc.), etc., the program can be stored in a storage unit (database, etc.) 22 in an external device (server, etc.) for transmission through a network, memory (RAM or a hard disk, etc.) 23, etc. in the body of an information processing device. A program stored in the portable recording medium 21 and the storage unit (database, etc.) 22 is loaded in the memory 23 in the body of an information processing device and is then executed.

As described above, according to the present invention, a more appropriate data analysis can be performed by inputting an operation level for distinction of coexisting observation and operation attributes in time series data.

What is claimed is:

1. A computer-readable storage medium storing a data analysis program used to direct a computer to perform a method comprising:

a receiving procedure of receiving two time series cases of free correspondence comprising a plurality of data points, each data point having one piece of time data and a plurality of attribute values, and an operation level indicating how each attribute works on a state of the time series case, and a data analysis procedure of obtaining an optimum correspondence set between data points between the two time series cases by a processing system depending on the operation level, and obtaining a distance between the two time series cases using the processing system depending on the operation level, wherein the data analysis procedure includes:
  a procedure of calculating a distance between data points by calculating distances of substantially all combinations between data points between the two time series cases using the distance calculating system depending on an operation level, the procedure of calculating the distance between data points outputting a first distance for a primary correspondence as a one-to-one correspondence, and a second distance for a secondary correspondence as a non-one-to-one correspondence when there is another primary correspondence for each attribute of each combination of data points; and
  a shortest distance calculating procedure of calculating a shortest distance between the two time series cases using the distances of substantially all combinations of data points calculated by the procedure of calculating the distance between data points, the shortest distance calculating procedure obtaining the shortest distance between the two time series cases under a condition in which one or less of correspondences held by each data point is the primary correspondence, and another is the secondary correspondence.

2. The storage medium according to claim 1, wherein the procedure of calculating the distance between data points outputs a distance between attributes of the two time series cases as the first distance for the primary correspondence, and outputs an internally dividing value depending on the operation level relating to the attribute, between a distance obtained when there are different attribute values between attributes of the two time series cases and a distance for the primary correspondence, as the second distance for the secondary correspondence.

3. The storage medium according to claim 1, wherein the procedure of calculating the distance between data points outputs as the second distance for the secondary correspondence, a value equal to the first distance for the primary correspondence when any of attribute values of attributes of positive operation levels of data points in combinations of the data points is a non-operational value not affecting a state of the time series case.

4. The storage medium according to claim 1, wherein the operation level is 0 or 1.

5. A data analysis device, comprising:
  an input unit of inputting two time series cases of free correspondence comprising a plurality of data points each data point having one piece of time data and a plurality of attribute values, and an operation level indicating how each attribute works on a state of the time series case; and
  a data analysis unit of obtaining an optimum correspondence set between data points between the two time series cases by a processing system depending on the operation level, and obtaining a distance between the two time series cases using a processing system depending on the operation level, wherein the data analysis unit includes:
  a unit of calculating a distance between data points by calculating distances of substantially all combinations between data points between the two time series cases using the distance calculating system depending on an operation level, the unit of calculating a distance between data points outputting a first distance for a primary correspondence as a one-to-one correspondence, and a second distance for a secondary correspondence as a non-one-to-one correspondence when there is another primary correspondence for each attribute of each combination of data points; and
  a shortest distance calculating unit of calculating a shortest distance between the two time series cases using the distances of substantially all combinations of data points calculated by the unit of calculating a distance between data points, the shortest distance calculating unit obtaining the shortest distance between the two time series cases under a condition in which one or less of correspondences held by each data point is the primary correspondence, and another is the secondary correspondence.

6. A data analysis method, comprising:
a receiving operation of receiving two time series cases of free correspondence comprising a plurality of data points, each data point having one piece of time data and a plurality of attribute values, and an operation level indicating how each attribute works on a state of the time series case, and
a data analysis operation of obtaining an optimum correspondence set between data points between the two time series cases by a processing system depending on the operation level, and obtaining a distance between the two time series cases using the processing system depending on the operation level, wherein the data analysis operation includes:
  calculating a distance between data points by calculating distances of substantially all combinations between data points between the two time series cases using the distance calculating system depending on an operation level, the calculating of the distance between data points outputting a first distance for a primary correspondence as a one-to-one correspondence, and a second distance for a secondary correspondence as a non-one-to-one correspondence when there is another primary correspondence for each attribute of each combination of data points; and
  calculating a shortest distance between the two time series cases using the distances of substantially all combinations of data points calculated by the calculating of the distance between data points, the calculating of the shortest distance obtaining the shortest distance between the two time series cases under a condition in which one or less of correspondences held by each data point is the primary correspondence, and another is the secondary correspondence.

* * * * *